Jan. 28, 1936.  F. R. FAGEOL ET AL  2,028,829
TRANSPORTATION VEHICLE
Filed Dec. 7, 1931  5 Sheets-Sheet 1

Inventors
William B. Fageol
Frank R. Fageol
By
Strauch & Hoffman
Attorneys

Jan. 28, 1936.  F. R. FAGEOL ET AL  2,028,829
TRANSPORTATION VEHICLE
Filed Dec. 7, 1931  5 Sheets-Sheet 2

Inventors
William B. Fageol
Frank R. Fageol

By Strauch & Hoffman
Attorneys

Jan. 28, 1936.　　　F. R. FAGEOL ET AL　　　2,028,829
TRANSPORTATION VEHICLE
Filed Dec. 7, 1931　　　5 Sheets-Sheet 5

Inventors
William B. Fageol
Frank R. Fageol

By Strauch & Hoffman
Attorneys

Patented Jan. 28, 1936

2,028,829

UNITED STATES PATENT OFFICE 2,028,829

TRANSPORTATION VEHICLE

Frank R. Fageol and William B. Fageol, Kent, Ohio, assignors to Twin Coach Company, Kent, Ohio, a corporation of Delaware Application December 7, 1931, Serial No. 579,576

10 Claims. (Cl. 180—54)

This invention relates to passenger-carrying motor vehicles and particularly to the type known as motor busses having internal combustion engines.

In many prior types of vehicles of this character the total available space has not been efficiently utilized for the transportation of passengers and their luggage. As generally heretofore constructed, these busses have the complete power plant including the engine projecting forwardly from the body of the vehicle and the body does not extend over the engine nor to either side thereof. Therefore a substantial portion of the area of the chassis or base frame of the vehicle is not available for the carrying of passengers or their luggage.

Efforts have been made to provide additional space for passengers by extending the vehicle a substantial amount in back of the rear axle, but this arrangement is unsatisfactory, due principally to the resultant unbalanced load on the wheels and axles, and causing excessive strains on the body and framing of the vehicle.

This invention aims to provide a passenger-carying motor bus which is extremely light in weight considering the number of passengers capable of being carried, and wherein the maximum available space is utilized to the carrying of passengers and their luggage, and wherein the weight of the vehicle both loaded and unloaded is balanced with respect to the axles and wheels. The body of the vehicle is co-extensive with the base frame whereby the total area of the frame is utilized. The driving means comprising an internal combustion engine is disposed at the forward end of the vehicle and projects above the floor of the passenger-carrying body and is contained in a housing, with ample space on each side thereof which is efficiently used in the present invention. On one side of the engine the operating controls are compactly arranged adjacent a driver's seat, and on the other side a double seat for carrying two passengers facing to the rear of the vehicle may be arranged partly over the housing enclosing the engine, leaving ample space to the rear of this forward seat for carrying luggage. For this purpose the housing for the engine and its accessories extends to one side of the vehicle body, providing a shelf space for packages and luggage.

This invention further aims to provide a motor vehicle of the passenger-carrying type in which the body extends completely over the internal combustion engine, the engine projecting upwardly into the body, and enclosed within a housing, with one or more passenger seats arranged over said housing and adapted to be secured to folding shelf members constituting the engine housing, whereby the seats and the housing may be folded out of the way when it is desired to have access to the engine and its accessories.

Another object of this invention is to provide a passenger-carrying vehicle with a very low center of gravity and with a floor aisle which extends longitudinally of the vehicle and to one side of the center line thereof, the seats being arranged on shelves which are one step above the aisle, with the drive shaft extending from the forward power plant to the rear axle beneath the shelf provided by the seats on one side of the vehicle. By this construction a very low aisle extends substantially the full length of the vehicle and the drive shaft may be positioned above the level of this aisle. Also by this construction, passengers are enabled to enter the vehicle by stepping directly into the same on the floor level without having to make two upward steps. Furthermore, maximum head room is provided for standing passengers in the aisle with a low roof, resulting in the light weight construction having a low center of gravity and therefore safe and comfortable in riding at high speeds. By this construction it is also possible to have a central power plant engine housed by the body with the propeller shaft extending directly to the rear axle in combination with a low floor line, the propeller shaft being arranged centrally of the vehicle without excessive vehicle width. In addition, by arranging the internal combustion engine in front of the vehicle body and forwardly of the front axle, it is possible to provide a low entrance door to the rear of the front axle, allowing entrance by passengers to the low floor aisle which is substantially below the level of the propeller shaft.

With the arrangement of the engine projecting upwardly into the body of the bus adjacent the forward end thereof, in combination with the driver's seat positioned to one side of the engine, it is desirable to position the gear shifting transmission just to the rear of the engine. However, this arrangement makes the usual gear shifting lever inaccessible to the driver. Heretofore complicated remote control mechanisms have been provided for shifting gears when the driver is seated as described, and it is an object of this invention to simplify this construction by providing a gear shift lever which extends forwardly to a readily accessible position for operation by the driver and which directly shifts the gears of the rearwardly positioned transmission. This novel gear shift lever mechanism further utilizes all available space, since the gear shift lever is out of the way of the passengers. Furthermore the gear changing is accomplished by a substantially vertical movement of the gear shift lever handle instead of a horizontal movement as at present arranged in most busses. With a horizontally movable gear shift lever handle, a substantial space must be left around the lever to accommodate the movements thereof. In the present invention the end of the lever moves substantially vertically and therefore takes up very little room, and yet this leverage and mechanism may be utilized with the standard form of transmission mechanism wherein the shifting takes place by a forward and reverse movement of the changeable gears therein.

This invention further provides a novel base frame for a passenger-carrying vehicle which is extremely light in weight and yet is strong and durable and has a low center of gravity, and which may be constructed of lighter framing members.

A further object of the present invention is to provide a passenger-carrying vehicle having a base frame of relatively light framing members, the frame being rigidly united to a body construction also formed of relatively light frame members, the frame and body being so constructed and united that each reinforces the other. The body frame members are further united together by light metal alloy body panels or plates so that all parts form a box-like construction wherein ample strength and rigidity is obtained with a material reduction in weight. In prior constructions the frame members of the chassis were necessarily made heavy since the body of the vehicle was completely supported thereby and the body did not brace or strengthen the separate chassis in any way. In contrast to this practice, the vehicle of this invention does not embody a separate chassis designed to take all stresses, but on the contrary a base frame is provided which together with the body takes the load stresses. In this manner both the chassis and the body may be lighter in weight, the vehicle thus being cheaper to build and resulting in lower maintenance and operating costs.

This invention further provides a passenger-carrying vehicle in which the emergency door exit is positioned adjacent the front end of the vehicle at a point which is readily accessible to the passengers and yet does not take up any of the passenger-carrying space. Preferably this emergency door is arranged directly opposite the entrance door.

This invention further provides a passenger-carrying vehicle in which the base frame of the body constitutes the chassis of the vehicle and wherein the frame is utilized to support the power plant and is resiliently connected to the wheel-carrying axles, the frame of the vehicle being so designed that the entire enclosed space within the confines thereof is utilized for passenger carrying space. Furthermore, in the vehicle of this invention, the internal combustion engine is directly supported from the frame in such manner that the weight of the frame members supporting the engine is a minimum.

A further object of the present invention is to improve the cooling system of the internal combustion engine of this type of vehicle wherein the engine is housed beneath the body of the vehicle. In some prior designs, the radiator of the internal combustion engine has also been housed by the vehicle body and cooling air is drawn through the radiator shell into the body. It has been found that the efficiency of cooling is improved if the radiator projects beyond the front end of the vehicle, since the four sides of the radiator are thus exposed to atmospheric air. In the present design this projection of the radiator is accomplished without adding to the overall length of the vehicle, since the projecting radiator is within the confines of the front bumper and the front visor of the vehicle.

Further objects of the invention will appear from the following description and the appended claims when taken in connection with the accompanying drawings wherein:

Figure 4:
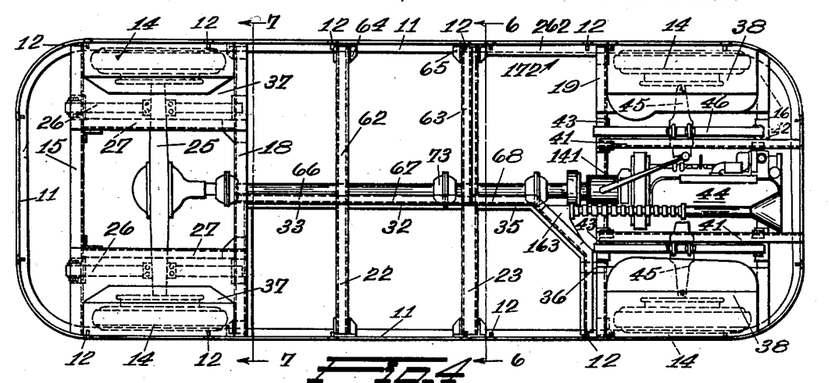
Figure 4 is a top plan view of the chassis lay out and framing members showing the engine, transmission and the heater mounted therein.
Figure 5:
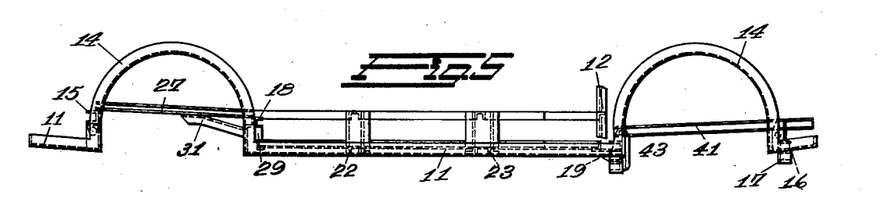
Figure 5 is a side elevation of the base frame of Figure 4.

Referring to the accompanying drawings wherein like characters designate like parts, and particularly to Figures 4 to 8, the chassis frame includes the marginal members 11 preferably of L section and of relatively light construction joined in substantially rectangular formation, with the corners thereof arcuate. This peripheral substantially rectangular frame is positioned within the planes of the two sides and the front and back of the rectangular body of the vehicle when the same is mounted on the chassis frame. Rigidly secured to the peripheral frame member 11 are vertically disposed relatively light T-irons 12 which form a support for the sides and ends of the vehicle body, as hereinafter described in detail. As indicated in Figure 5 the peripheral frame members 11 are angled upwardly at the front and rear of the vehicle to provide a slightly greater road clearance between the front and rear ends of the frame. Peripheral members 11 are interrupted adjacent each corner of the vehicle and to the spaced ends thereof are secured the ends of arcuate wheel housing supporting members 14 which are likewise of L section.

Two transverse connecting members 15 and 16 preferably of channel form connect the opposite frame members 11 adjacent the rear and front of the vehicle. The rear channel member 15, is secured to the rear portion of the arched members 14 defining the rear wheel housings. The forward transverse member 16 is secured to the members 14 and 11 at their juncture, and member 16 has a depressed central portion 17 as seen in Figure 8.

Figure 8:
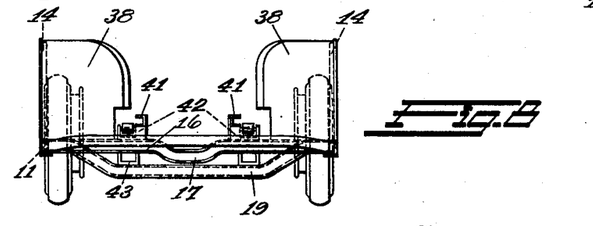
Figure 8 is a front elevation of the base frame of the vehicle prior to the assembly of the body therewith.

Additional transverse members 18 and 19 preferably of channel formation are connected to the inner sides of the two sections 14 forming wheel wells, member 19 being offset downwardly as seen in Figure 8. The downward offset of the two cross members 16 and 19 is to accommodate the engine for the bus as hereinafter described, and to allow movement of the front spring shackles.

The transverse members 15 and 18 adjacent the rear end of the vehicle are in a plane above the plane defined by the peripheral members 11. The cross member 15 is connected to the rear arched wheel housing members 14 by brackets. As seen in Figure 4, the rear axle 25 is connected by springs 26 to the two cross transverse members 15 and 18. Torsional strains imposed by the springs on the brackets and the transverse members 15 and 18 during heavy loads are taken care of in part by short longitudinal members 27 parallel to each spring 26 and secured to the transverse members 15 and 18.

Figure 7:
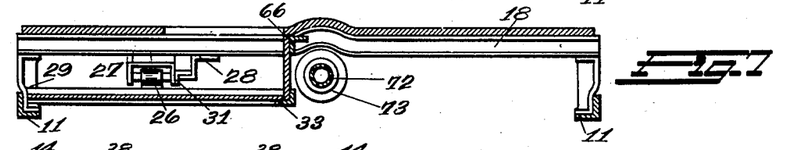
Figure 7 is a section on line 7—7 of Figure 4.

As seen in Figures 5 and 7 the spring shackles or brackets 27a for the forward end of the rear springs 26 are supported by short longitudinally extending members 31 preferably of L form which extend beneath the longitudinal members 27 and are secured thereto at one end. The members 31 project downwardly beneath the transverse channel member 18 and are supported therefrom by depending brackets 28 secured to transverse member 18 and the angle members 31, as seen in Figure 7.

As seen from Figures 5 and 7, the transverse member 18 is rigidly supported at the two sides of the vehicle by a bracket member 29 which extends beneath the channel 18 and is secured thereto, and extends downwardly to the peripheral frame member 11 and is connected thereto, and is also secured to the flange of the angle member 14 forming the wheel housing.

It will be noted from an inspection of Figure 4 that the base frame of this vehicle is not provided with central longitudinally extending frame members which extend the full length of the vehicle. One important object of this invention is to provide an extremely light vehicle, and it has been found that sufficient strength and rigidity can be obtained from the novel framing and body constructions herein described without the necessity of heavy longitudinal framing members as used in prior vehicle constructions.

Figure 2:
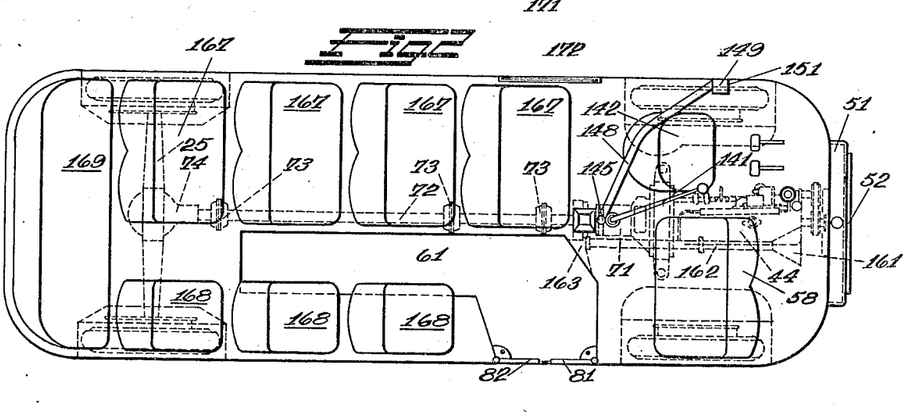
Figure 2 is a top plan view taken just beneath the roof of the vehicle showing the arrangement of the seats and the control mechanism with relation to the driver's seat.
Figures 9, 11, 12:
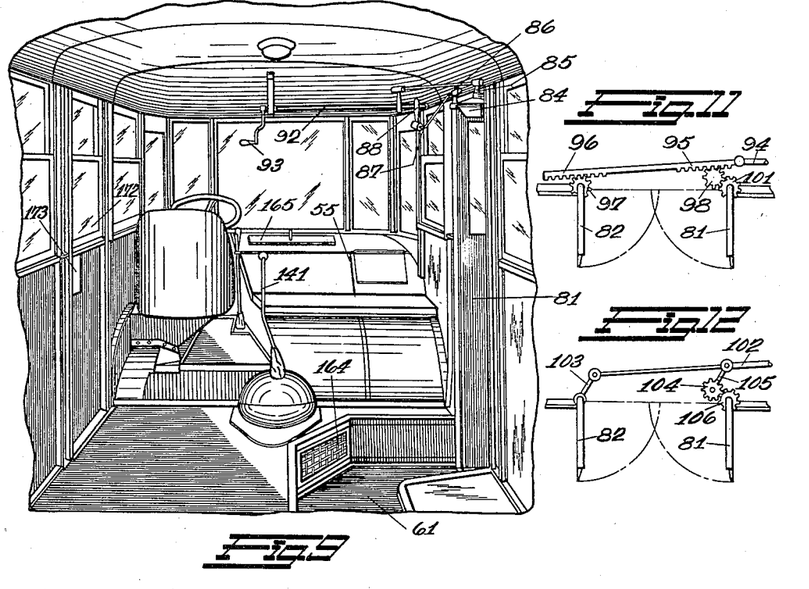
Figure 9 is an interior view looking toward the front of the vehicle, showing the depressed aisle, the driver's compartment, and the arrangement of the door operating mechanism.
Figures 11 and 12 are plan views of slightly modified forms of the door operating mechanism.

As seen in Figures 2 and 9, the vehicle of this invention is provided with a depressed aisle 61 with seats on opposite sides thereof positioned above the aisle level. This depressed aisle 61 is arranged offset from the longitudinal center line of the vehicle. The transverse members 22 and 23 are connected by a relatively short longitudinal framing member 32, preferably of L formation, and a similar member 33 is secured to transverse member 22 and to member 18 by a vertical bracket. The longitudinal members 32 and 33 as seen in Figure 4 are displaced a short distance toward the right hand side of the vehicle.

Extending forwardly from the transverse member 23 is the L member 35 which is in effect a continuation of members 32 and 33, member 35 having two 45° bends therein as seen in Figure 4 so that the forward end thereof extends parallel to and is slightly spaced from the forward transverse member 19, and is secured thereto by a plate 36. As seen from Figures 6 and 7, the members 32, 33 and 35 are substantially in the plane of the floor level of the depressed aisle 61. The member 35 in combination with the members 32 and 33 define the one side wall of the depressed aisle 61 of the vehicle. Member 35 extends to the side of the vehicle and nests within the angle of one of the vertical T members 12 and is secured thereto and to the peripheral member 11. It will be noted that members 32 and 33 have the lower angle thereof projecting outwardly toward the aisle 61 to form a support for the flooring of the aisle.

At the forward end of the base frame, the transverse members 16 and 19 are positioned in the plane of and are directly connected to the peripheral members 11. Wheel housings are provided from sheet metal which project inwardly over the base frame, the rear wheel housings 37 being secured to the peripheral frame members 14 which extend upwardly over the wheels of the vehicle, and are also secured to the short longitudinal members 27 and the transverse members 15 and 18. The front wheel housings 38 are connected to the transverse members 16 and 19 and to the peripheral frame member 14. The transverse front members 16 and 19 are connected by short longitudinal framing members 41 which are positioned above the transverse members 16 and 19 and are connected thereto by plates 42. The arrangement of transverse members 16 and 19 and longitudinal members 41 forms a rectangular frame work upon which is mounted the internal combustion engine 44 of the vehicle. The engine 44 is mounted by rubber or other resilient members whereby vibrations are not transmitted to the frame and body of the vehicle.

The front axle 45 is of the drop center type and the front springs 46 pass above the front axle and are secured thereto and to spring shackles mounted on the plates 42 and 43 which connect the framing members 41 to the transverse framing members 16 and 19, the front spring shackles being stationarily mounted on rubber bushings and the rear ones being mounted on rubber bushings in pivoted shackles.

Figure 1:
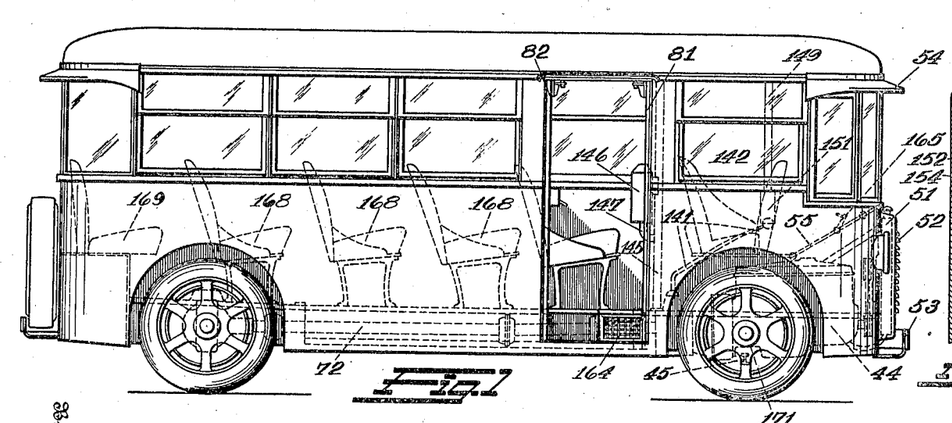
Figure 1 is a side elevation of the vehicle of this invention with the doors thereof open.

The internal combustion engine 44 is readily insertable into the base frame of the vehicle through the front thereof, which is provided with an opening which is normally closed by a removable radiator 51 provided with louvers 52. As seen in Figures 1 and 2, the radiator 51 projects beyond the body of the vehicle, so that it is exposed completely to atmospheric air on all four sides and the front, and yet the radiator does not add to the overall length of the vehicle since it is within the confines of the front bumper 53 and the visor 54. As seen further in Figure 1, the internal combustion engine 44 projects upwardly above the floor level of the body of the vehicle and is encased within a housing 55. The air drawn through the cooling radiator 51 by the usual fan driven from the internal combustion engine is drawn into the housing 55. As seen in Figure 9, the housing 55 extends from the right hand side of the vehicle past the longitudinal center thereof and then terminates to leave a space beside the housing at the left hand front corner of the vehicle for a driver's seat and for the operating and steering controls of the vehicle.

Figures 20, 21, 22, 23, 24, 25:
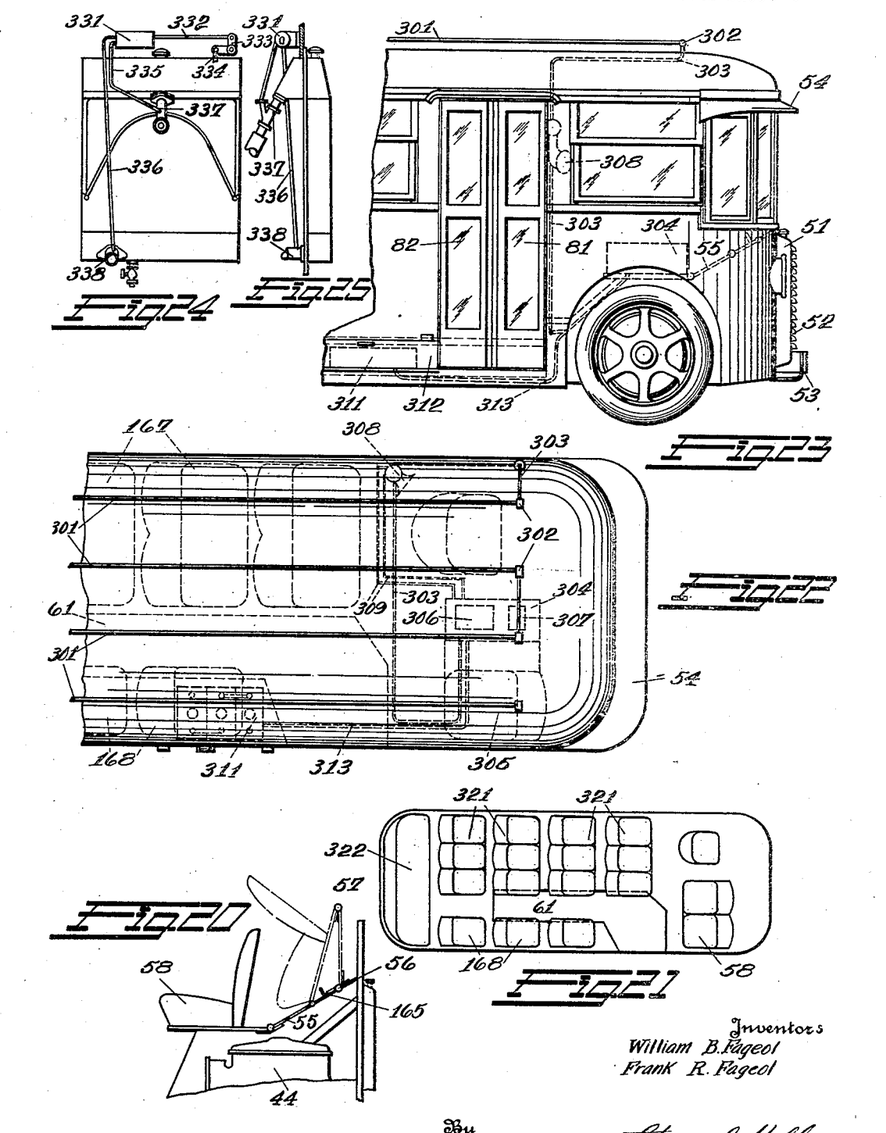
Figure 20 is a broken detail showing the folding seat over the engine housing.
Figure 21 shows in plan a slightly modified seating arrangement.
Figure 22 is a plan view showing the position of the radio receiver and speaker.
Figure 23 is a side elevation of Figure 22.
Figure 24 is a rear view of the radiator showing a thermostatic control for the radiator shutters.
Figure 25 is a side elevation thereof.

The housing 55 provides ample space for containing the internal combustion engine and the various accessories of the vehicle, including the starting motor, electric generator, carburetor, valve timing mechanism, pumps, and various other units. In order that the internal combustion engine and its accessories may be readily accessible for inspection and repairs, the housing 55 as indicated in Figure 20 may be swung upwardly about pivotal connection 56, the housing being formed in two parts which are joined by hinges at 57. In order to efficiently utilize all available space for the carrying of passengers and their luggage, the folding shelf portion of the housing 55 is provided with a seat 58 for two passengers facing the rear of the vehicle and this seat may be readily swung upwardly with the folding portions of the housing 55 when access is desired to the motor and its accessories. When in its normal position as shown in full lines in Figure 20, the seat 58 is spaced from the front of the vehicle, providing an ample shelf space between the rear of the seat and the front of the vehicle upon which luggage and packages may be placed. It will be understood that the seat 58 over the engine housing may be mounted in any convenient manner whereby it can be readily removed in order to open the engine housing.

From the arrangement as seen from Figures 2 and 9, it will be apparent that the whole front end of the vehicle is utilized, the left hand side thereof being occupied by the operator of the vehicle and the control mechanisms, and the space over the engine being occupied by a double rearwardly facing seat and shelf space for packages and luggage.

Figure 6:
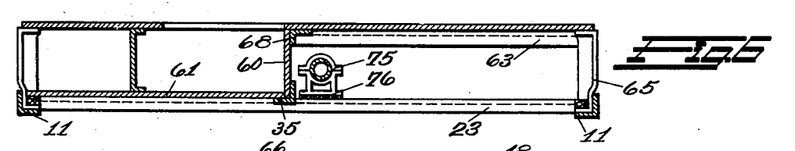
Figure 6 is a section on line 6—6 of Figure 4.

As previously described, the vehicle of this invention is provided with a depressed aisle 61 extending longitudinally thereof and to one side of the center line as seen in Figures 2 and 9. Aisle 61 provides a wide platform to the left hand side of the vehicle and a narrow platform to the right hand side thereof, upon which the seats are mounted. These seat platforms are mounted on the base frame of the vehicle one step above the level of aisle 61, as seen in Figures 6 and 7.

Positioned above the transverse members 22 and 23 are shorter transverse channel members 62 and 63, which are secured to the peripheral frame members 11 by upwardly extending plates 64 and 65. The channels 62 and 63 extend just beyond the longitudinal center line of the vehicle and are connected to the members 22 and 23 by plates 60 at the inner ends of members 62 and 63. Positioned above the longitudinal members 32, 33 and 35 are longitudinal extending L members 66, 67 and 68, member 66 being secured to the transverse channel member 18 and to the inner end of the shorter transverse channel 62, member 67 being secured to the inner ends of channels 62 and 63, and member 68 having two 45° bends therein similar to member 35, and extending to the side of the vehicle.

The supporting members 62, 63, 66, 67 and 68 for the left hand platform are substantially in the plane of the transverse members 15 and 18, and a common platform flooring may then be mounted directly on these members, the flooring extending completely across the rear of the vehicle as seen in Figure 2 and forwardly on the left hand side of the vehicle to define one edge of the depressed aisle 61. Seats may be arranged on this platform as illustrated in Figure 2, with four double forwardly facing seats 167 and one rear forwardly facing seat 169 extending completely across the rear of the vehicle.

This platform is continued on the right hand side of the vehicle as seen in Figure 2, to define a platform space for supporting three single forwardly facing seats 168.

By the provision of the depressed aisle 61 slightly offset with respect to the center line of the vehicle, it is possible to provide a low hung vehicle, and yet provide ample road clearance by running the propeller shaft to the driven rear axle between the floor level of the platform and the framing members. As seen in Figure 2, the internal combustion engine 44 is provided with the usual transmission 71 mounted adjacent the rear of the engine, and the propeller shaft 72 provided with the universal joint 73 extends directly to the differential 74 of the rear axle 25. Propeller shaft 72 is positioned centrally of the vehicle and need not be offset to accommodate the depressed aisle 61, thus simplifying the construction. Furthermore, the transverse member 23 supports a bearing for the propeller shaft. As illustrated in Figures 4 and 6, a mid ship bearing 75 for the propeller shaft 72 is supported on channel 23 by a rubber mounting 76, thus preventing any vibration of the propeller shaft from being transmitted to the body of the vehicle.

The body of the vehicle, to be hereinafter described in detail, is provided with a single entrance and exit doorway which, as seen in Figure 1, is just to the rear of the front axle and opens directly into the depressed aisle 61. Thus passengers may enter the vehicle by one step instead of having to make two steps as is common to most prior designs. Furthermore, the depressed aisle allows ample standing room for passengers who cannot be seated and yet the top of the bus may be relatively low with respect to the chassis base frame, thus maintaining a low center of gravity, resulting in safe operation at high speeds. The entrance is adapted to be closed by two outwardly swinging doors 81 and 82.

Figure 10:
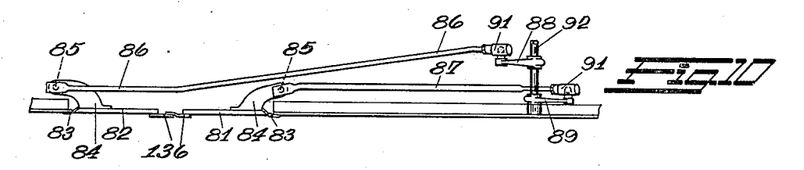
Figure 10 is a detailed plan view of the door operating mechanism of Figure 9.

One aim of this invention being to provide a compact, light-weight vehicle in which all available space is utilized for the carrying of passengers and luggage, it is very desirable that the door operating mechanism be so positioned that it does not occupy room which could otherwise be utilized. With this end in view, the door operating mechanisms of the present invention are arranged adjacent the roof of the bus in a position for ready access by the operator of the vehicle and yet completely out of the way of the passengers. As seen in Figures 9 and 10, the doors 81 and 82 are pivoted about hinge members 83 and each door is provided with a bracket member 84 secured thereto. Each bracket 84 has an arm 85 to which are secured links 86 and 87 by a universal joint connection. Links 86 and 87 are connected to crank arms 88 and 89 respectively by universal joint connections 91, and these crank arms are rigidly secured to a transverse operating bar 92 extending across the roof of the vehicle and provided at its opposite end with a crank handle 93.

The doors are shows open in Figure 9, and it will be seen that the handle 93 is in its lower position. When it is desired to close the doors the handle 93 is swung away from the front of the vehicle and upwardly toward the roof thereof, thus rotating the cranks 88 and 89 and pulling the doors positively closed. To open the doors, the operator merely reaches up and pulls handle 93 downwardly, thus rotating the cranks to the open door position of Figure 9. Thus the door operating mechanism is readily operable by the driver and yet does not interfere with the passenger space.

Figure 11 illustrates a modified form of door operator in which the rod 92 has a single crank thereon to which is secured the bar 94 having rack teeth 95 and 96. The rack 96 directly engages the pinion 97 of the door 82, and the rack 95 engages an idler pinion 98 which in turn engages the pinion 101 of door 81. It will be apparent that when the rod 94 reciprocates the pinions 97 and 101 will be rotated in reverse directions to open and close the doors.

In Figure 12 a single operating bar 102 is directly connected by a link 103 to door 82, and further serves to rotate pinion 104 by shaft 105. The pinion 104 engages the pinion 106 on door 81. It will thus be seen that reciprocation of rod 102 causes reverse rotation of the doors 81 and 82. The rod 102 is connected to a crank on the cross rod 92 operated by a handle 93 similar to the construction of Figure 9.

Figure 13:
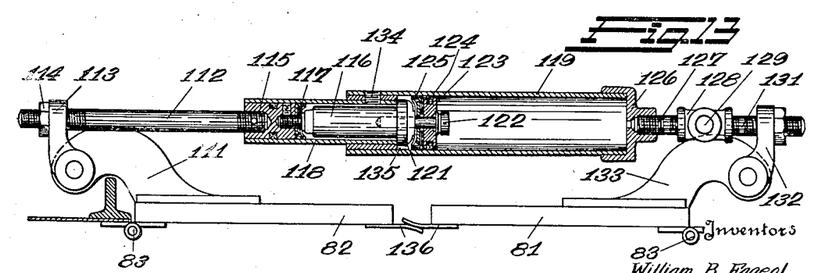
Figure 13 is a top plan partly in section of a pneumatically operated door mechanism.

Figure 13 illustrates a pneumatically operated door mechanism, which is sometimes desirable when air pressure is available on the bus. In this form, the doors are positively maintained both in closed and open position by air pressure. The driver of the vehicle operates the doors by a controlling valve handle which is placed in a readily accessible position. Door 82 is provided with a bracket 111 connected to a reciprocating rod 112 which is threaded through arm 113 of bracket 111 and secured by lock nut 114. At its opposite end, rod 112 is threaded into a piston 115 to which is secured a rod 116, with a leather washer or other sealing means 117 secured between members 115 and 116. Piston 115 and connected rod 116 and washer 117 are adapted to reciprocate within a cylinder 118 secured to a larger cylinder 119. The rod 116 has an enlarged head 121 which is adapted to engage the end of cylinder 118 when the doors are closed as in Figure 13. The head 121 has secured thereto by a bolt 122 a piston 123 provided with a sealing ring 124 and a leather washer 125. The piston 123 and washer 125 are adapted to fit closely within cylinder 119 and reciprocate therein. At its opposite end cylinder 119 is closed by a threaded cap 126 to which is threaded a drilled bolt 127 whose opposite end is secured to the fitting 128 having an opening 129 for the entrance of air. A bolt 131 is secured to fitting 128 and to arm 132 of bracket 133 which is secured to door 81. The cylinders 118 and 119 have corresponding openings 134 whereby air may be admitted to cylinder 118.

The operation of this pneumatic door operating mechanism is as follows: Normally air is admitted to opening 129 which then passes into cylinder 119 and reacts against the piston 123 to hold the interconnected rods 116 and 112 in the position shown in Figure 13, thus maintaining door 81 closed. The air also reacts against the cap 126 of cylinder 119 to press the cylinder 119 and connected fitting 128, bolt 131 and bracket 133 to maintain door 81 closed. When it is desired to open the doors, the operator moves the valve handle to allow air to enter the opening 134. This air reacts against the leather washer 125, and since the area thereof is greater than the area of the sealing washer 117, the head 121 and piston 123 move to the right of Figure 13, thus pulling the rods 116 and 112 to swing the door 82 to open position. At the same time, the air reacts against the end face 135 of cylinder 118 to force the connected cylinders to the left of Figure 13, thus pulling the bolt 127, fitting 128, bolt 131, and bracket 133 to swing the door 81 open. When the valve actuating handle is reversed and the air is admitted to port 129, the doors are closed. The valve is so arranged that air is constantly admitted to the cylinders at all times, and the doors are thus constantly maintained either opened or closed. Due to the large area of piston 123 and cylinder cap 126, a strong pressure maintains the doors closed at all times.

It will be noted that in all of the doors disclosed, the edges thereof are provided with rubber overlapping members 136 so that a substantially air-tight seal is maintained, and yet injury by the inadvertent closing of the doors on passenger's hands is impossible. Further, the air pressure for operating the doors of Figure 13 is so regulated that injury to an entering or leaving passenger is impossible since the doors do not have sufficient pressure to prevent them being held in an intermediate position if a passenger is caught therebetween.

The door operating mechanisms herein disclosed are particularly desirable for these passenger busses wherein all available space is utilized, since the operating mechanisms of this application are so positioned that they are adjacent the roof of the bus and are thus out of the way.

A further conservation of space is obtained in this invention by the arrangement of the gear shift lever such that no useful passenger space is occupied thereby, and a standard form of gear shift transmission is used. As seen in Figures 1 and 2, the gear shifting lever 141 projects directly upwardly from the transmission 71 and then is bent forwardly toward the left hand side of the vehicle at such angle as to have the handle thereof adjacent the driver's seat 142, and beside the adjacent passenger seat 58. The angularity of the gear shift lever 141 is such that the end of the lever moves substantially in a vertical plane for changing gears. Thus practically no space is wasted by the gear shift lever which extends to a position of ready access and yet does not interfere with the passenger space, and since its movements are substantially vertical no space need be provided around the lever as is usually necessary.

From an inspection of Figure 2 it will be seen that the driver's seat is positioned forwardly of the entrance doors 81 and 82, and in order to avoid the necessity of the driver turning around to face the rearwardly positioned doors to collect fares and make change, an automatic fare propelling system is part of this invention, whereby the fare may be deposited at a point adjacent the door entrance, and is automatically transferred to a fare box adjacent the driver's seat 142. For this purpose an upright tube or stanchion 145 is provided which extends from the floor of the bus just back of the transmission 71 to the roof of the vehicle, and supports a fare-depositing box 146 provided with a conduit 147 whereby the coin deposited may pass into the rod 145. The tube 145 is hollow and is adapted to transfer the coin upwardly to the roof of the vehicle, and thence by way of transverse conduit 148 to a vertical conduit 149 to a fare box 151 positioned on the left side of the vehicle adjacent the driver's seat 142.

Figure 3:
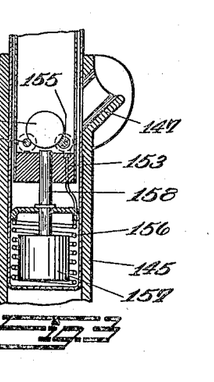
Figure 3 is an enlarged sectional view of the box in which the fare is received and the impelling mechanism for transferring the fare to the final fare box adjacent the driver.

In order to automatically transfer the deposited fare from box 146 to fare box 151, the mechanism shown in Figure 3 is used, although it will be understood that pneumatic or other forms of transfer mechanism may be used in this combination.

Referring to Figure 3, the transfer conduit 147 is adapted to allow the coin 152 to enter the hollow tube 145 as seen in Figure 3. Extending across the tube 145 is a block 153 and also two contact members 154 and 155. The entering coin 152 is adapted to close an electrical contact between the two contacts 154 and 155, to thus close an electrical circuit for solenoid 156 having a movable core 157. Core 157 is connected to a rod 158 which projects upwardly through block 153 to a position normally just beneath the coin 152.

The operation of this coin projector is as follows: When the coin is deposited in box 146 it rolls down through tube 147 to the position shown in Figure 3, where it bridges electrical contacts 154 and 155 to close the circuit for solenoid 156. The core 157 thereof is rapidly drawn upwardly and the rod 158 impacts against the coin 152 and throws the same up to the roof of the vehicle from which point it rolls by gravity through the connecting chute 148 and downwardly through conduit 149 into box 151. As soon as the coin is impelled as described, the circuit for solenoid 156 is broken and the parts return to the position shown in Figure 3.

By this mechanism the bus driver may sit well in the forward end of the vehicle, and the entrance thereof may be further back, for example, to the rear of the front wheels as shown in this application. Coins may be deposited in the box adjacent the entrance of the vehicle and are automatically propelled to a fare box which may be near the driver. Therefore the driver does not have to turn around in his seat to examine the deposit of fares by the passengers.

Another important feature of this invention is the arrangement of the heater devices for the vehicle. As seen in Figure 2, the air which is drawn through the radiator 51 by the usual fan may enter a funnel shaped member 161 connected with a conduit 162 which surrounds the exhaust muffler of the internal combustion engine to thereby highly heat the air being forced therethrough. The conduit 162 is connected to a funnel-shaped housing 163 which opens into the grill 164. As seen in Figures 1 and 9 grill 164 opens into the body of the vehicle at the angular portion of the depressed aisle 61. Thus the highly heated air enters the bus at a point where it is normally driven toward the rear of the vehicle and substantially centrally thereof to provide an even temperature throughout without providing for points of exceedingly high temperature adjacent the passengers. Furthermore, the entrance of air into the depressed aisle adjacent the door opening serves to prevent excessive blasts of cold air into the bus when the doors are opened, since this heated air tends to repel the entrance of cold air.

As a further means for warming the front part of the bus adjacent the driver and also to prevent the frosting of the windshield and the deposits of snow and ice thereon in cold weather, an additional heating means is provided as shown in Figures 1, 9 and 20. Between the forward passenger seat 58 and the windshield, the engine housing 55 is provided with an auxiliary door 165. When this door is swung open as indicated by dotted lines in Figure 1, some of the air being forcibly drawn through the radiator by the engine fan is deflected upwardly into the bus body and impinges against the inner face of the windshield and then passes upwardly and back into the vehicle. The door 165 acts as a baffle to deflect the air from the hottest part of the radiator into direct contact with the windshield to prevent frosting thereof. It will be understood that the supply of the heated air passing through the conduit 162 and out of the grill 164 may be regulated by valve means, not shown, and controlled from the driver's position.

From an inspection of Figure 2 it will be apparent that the maximum space has been utilized to the fullest extent in the novel vehicle of this invention, by the provision of the depressed aisle in combination with the raised platforms upon which the seats are arranged, the forward position of the driver which is possible due to the use of the remote fare box and the gear shift lever handle positioned as described, and the forward seat 58 with the space therebehind for the accommodation of the packages and luggage.

As seen in Figure 1 the bottom of the internal combustion engine is recessed at 171 to accommodate the front axle 45. By this recess sufficient clearance is obtained between the engine and the axle when the vehicle is passing over road irregularities, and the engine may be positioned close to the axle to give a low center of gravity.

Adjacent the front end of the vehicle and directly opposite the doors 81 and 82 is an emergency exit door 172 normally held closed by latch mechanism 173. It will be seen that this emergency door is in a readily accessible position just in back of the driver's seat and adjacent the forwardly disposed double seat. This emergency door is therefore not in the way and does not occupy any additional space in the vehicle.

The base frame construction herein described in detail is materially lighter in weight than the usual chassis provided for vehicles of this nature. This base frame is not adapted to carry the load of the vehicle except when combined with a body construction which reinforces the base frame to provide the necessary rigidity and strength. The base frame herein disclosed may be associated with various types of body constructions, such as delivery trucks, or busses of various types which reinforce the base frame members. As herein disclosed the base frame is combined with a passenger carrying vehicle having the body thereof constructed as follows.

Figure 14:
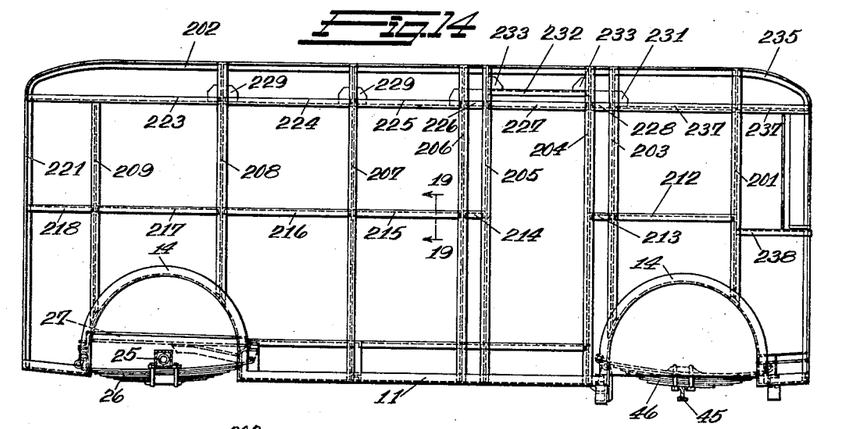
Figure 14 is a side elevation of the base frame and body assembled, with the axles and springs.
Figures 15, 16, 17, 18, 19:
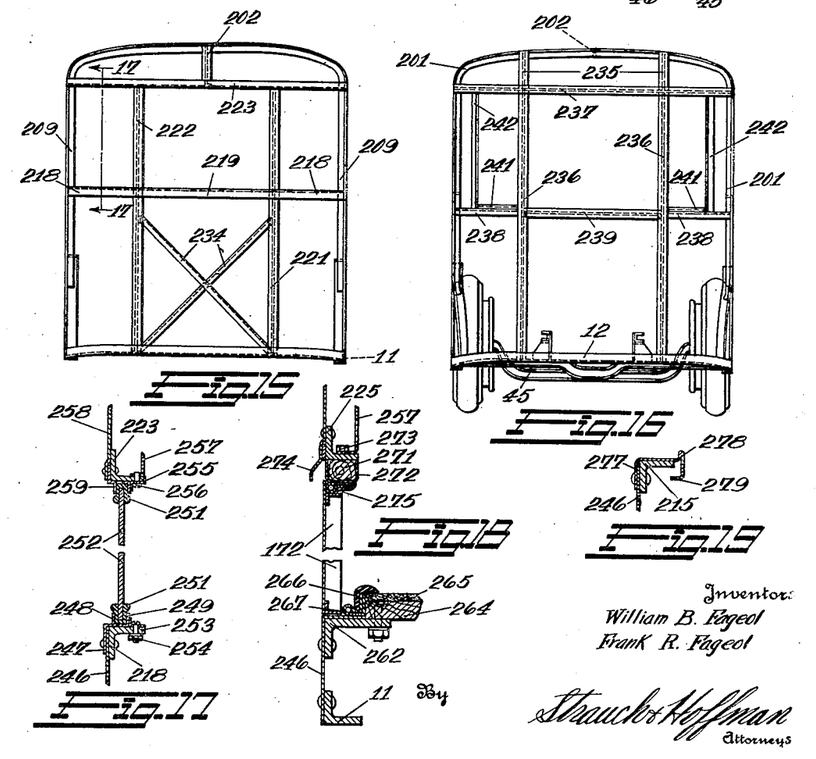
Figure 15 is a rear elevation of the vehicle of Figure 14.
Figure 16 is a front view thereof with the front wheels added.
Figure 17 is an enlarged section on line 17—17 of Figure 15.
Figure 18 is a section through the body at the emergency door opening.
Figure 19 is an enlarged section on line 19—19 of Figure 14.

Referring particularly to Figures 14 to 16, which are respectively a side elevation, a rear elevation and a front elevation of the body construction, a body member 201 of T form adjacent the front of the vehicle is connected at both sides of the vehicle to the members 14 forming the wheel housings. This T member 201 extends completely across the roof of the vehicle and is thus of U-shape. Extending down the center of the roof of the vehicle is a T member 202 which extends forwardly of the vehicle only as far as the member 201 and is suitably secured, preferably by a plate welded to both members. At the rear of the vehicle, the central T member 202 extends downwardly just beyond where the curvature of the roof joins with the vertical back of the vehicle, as seen in Figures 14 and 15. Additional side frame members of T form 203 to 208 also extend upwardly along the opposite sides of the vehicle and across the top thereof, and are suitably joined to the central longitudinal T 202, preferably by welding. These members 203 to 208 are preferably of U formation, the two legs of the U extending downwardly on opposite sides of the vehicle, and the base of the U being bent downwardly to form a notch to accommodate the central member 202. However, it will be understood that the members 203 to 208 may be formed in two halves which are suitably joined at the upper central portion of the vehicle to the longitudinal T member 202.

The rear side T members 209 do not extend across the roof of the vehicle, but terminate at the point where the vertical sides of the vehicle merge into the curved roof.

As seen in Figure 14, additional strength is provided to the body at the front end thereof adjacent the door openings for the entrance and exit door and the emergency door, which are positioned just to the rear of the front wheels. The front members 201, 203, and 204 are connected by transverse members 212 and 213, preferably of L formation. Members 212 and 213 are positioned at the base of the front windows on opposite sides of the vehicle and these windows may be raised. Additional transverse L members 214 to 217 are rigidly secured to the U shaped members 205 to 209, and these members 214 to 217 are also positioned at the base of the windows which may be raised. The L members 214 to 217 are continued across the curved back of the vehicle by similar L members 218 and 219. Members 218 and 219 are secured to vertical T members 221 and 222, which are suitably secured to the peripheral frame member 11 as seen in Figures 15.

Members 218 and 219 form the base sill for windows at the rear of the vehicle which however are not adapted to be opened. It will be understood that the members 218 and the windows above the same follow the curvature at the corners of the body as seen in Figure 2.

It will be understood that U shaped members 201, 203 to 209 are the T members 12 of Figure 4.

Extending longitudinally of and adjacent the top of the vehicle body are L members 223 to 228 which are positioned at the top of the stationarily positioned windows shown in Figure 1. The rear L member 223 is substantially of U shape and extends completely across the back of the vehicle and along the sides thereof to the vertical T members 208. At the point of intersection as seen in Figure 14, the members 223 to 228 are joined by plates 229 to T members 203 to 208.

In order to further strengthen the body and framing construction adjacent the two door openings, a sheet steel plate 231 extends across and is joined to members 203, 204, 205 and 206, preferably by welding. Additional strength is further imparted to the construction at this point by an angle iron 232 secured to the vertical T members 204 and 205 and also to plate 231. Suitable brackets 233 secure the angle member 232 to side members 204 and 205.

The rear end of the vehicle is furthermore braced by two crossed angle members 234 which are rigidly connected at their opposite ends to the vertical T members 221 and 222 and these members are also connected at their lower ends to the peripheral frame members 11, and are secured together at the point where they cross one another. This construction gives a rigid bracing to the rear body of the vehicle.

At the front of the vehicle as seen in Figure 16, there are two T members 236 which are joined at their lower ends to the peripheral frame member 11 extending across the front of the vehicle, and are joined at their upper ends to a T member 237, which is substantially in the shape of a U and is connected on opposite sides of the vehicle to the vertical portions of the U shaped members 201 and 203. T members 235 curve upwardly as a continuation of front members 236 and are secured to the roof portion of U shaped member 201. Angle members 238 extend around the front corners of the vehicle and are connected to the U shaped member 201 and to the front members 236. A transverse T member 239 extends across the front of the vehicle and is rigidly connected to the two vertically extending members 236. The rectangular opening provided by members 236, 237 and 239 is adapted to receive the windshield glass of the vehicle which is preferably stationarily mounted. Short curved angle members 241 are secured to the front members 236 and these members 241 follow the curvature of the front corners of the vehicle and are connected to vertical angle members 242 extending between the horizontal members 238 and 237. The openings provided between members 236, 241, 242 and 237 are adapted to receive stationarily mounted curved windows. Just in back of these curved windows are windows which are hingedly mounted about the vertical U shaped members 201, and these windows may be swung outwardly to admit air into the vehicle.

From the above description of the body construction, it will be apparent that a rigid box-like body is provided which is securely mounted on the base frame, in such manner that the parts mutually cooperate to brace one another.

The various body framing members are rigidly connected at all points where they intersect, preferably by welding and in some instances by the addition of bracing brackets or plates.

The entire box-like frame shown in Figures 14 and 16 is covered by metallic panels which are directly mounted upon the framing members and are riveted thereto. These body panels are preferably made of a special metal alloy which is light in weight, very strong and rigid, and is substantially non-corrosive. The roof, front, back and two sides of the vehicle are composed of these plates and when the assembly is complete the metal body plates contribute materially to the strength and rigidity of the complete vehicle. The assembled body and case frame as here described is materially lighter in weight than the usual vehicle construction having a similar passenger-carrying capacity, and is furthermore, materially stronger and more rigid to withstand road shocks.

Although the novel body and base frame construction herein disclosed is not so limited, a preferred method of assembly is substantially as described in copending application Serial No. 355,755, filed April 17th, 1929, now Patent #1,877,653, dated Sept. 13, 1932. The forward portion of the body is assembled and includes the front and the two sides and roof as far back as the rear of the two doors and the metal body plates are secured thereon, the assembly being made on templets; the rear, sides and roof as far forward as the doors are similarly assembled and these two sections are joined over the base frame shown in Figures 4 to 8 and all parts are then permanently united.

Details of the mounting of the glass in the vehicle body and the details of the framing members at the door openings are shown in Figures 17, 18 and 19. Referring particularly to Figure 17, which is taken on line 17—17 of Figure 15, it will be seen that the angle member 218 which extends across the back of the body has riveted to the exterior face thereof the special alloy metal plates 246 forming the exterior of the body. Also riveted to member 218 is a window retaining member 247 which extends inwardly over the angle of member 218 and has an upwardly projecting flange 248. On the interior side of the vehicle body and resting on top of the angle member 218 is a window trim angle 249, the lower angle of which extends beneath a felt or rubber gasket 251, which is substantially of U shape cross-section and is adapted to receive the window glass 252 which is curved around the corner of the vehicle. The gasket member 251 and the angle 249 are adapted to be retained in position by Z shaped interior trim strip 253 which is adapted to be retained in position on the angle 218 by a plurality of machine screws or bolts 254. One of the flanges of the Z member 253 engages the angle 249 to retain the window in position. At the upper end of glass 252, the U shaped member 251 is retained in position by a similar Z shaped trim strip 255 secured to the upper angle member 223 by bolts or machine screws. Bolts 256 also are adapted to secure the light sheet metal roof 257 of the vehicle to the angle member 223. The exterior roof member 258 is riveted to the angle 223 and encloses the edge of the retaining members 259 for the window. These stationary rear windows with the felt member 251 are adapted to fit into the angles of the vertical T members 221 and 222 whereby the maximum amount of light is admitted to the vehicle at the rear end thereof. The window glass member 252 may be readily removed by removing the machine screws 254 and 256 to thus remove the strips 253 and 255 to release the windows 252 and the U shaped strips 251.

Figure 19 is a detail showing the construction of the body framing members at the emergency door outlet. It will be noted from Figure 9 that this door 172 opens directly from the platform level at which the seats are positioned. Therefore, to provide a sill for the bottom of the door, an additional framing member 262 preferably of L formation extends across the emergency door outlet slightly below the platform level.

Angle member 262 shown also in Figure 4 is secured at one end directly to the short transverse channel member 63, and at its forward end by a bracket to the transverse member 19. As seen in Figure 18, the sheet metal panel 246 forming the outer surface of the body is turned inwardly over the angle 262. The flooring members 264, preferably of wood, and forming the platform of the vehicle rest upon the inwardly extending flange of the angle member 262 and a composition flooring 265 is secured to the floor member 264. A rubber or other resilient sealing member 266 extends downwardly over the edge of flooring members 264, 265 and a compressible tubular member 267 is also positioned on top of the outer sheathing members 246 in the corner adjacent the flooring 264. When the emergency door 172 is closed against the resilient members 266 and 267, a comparatively tight seal is maintained to prevent the entrance of moisture and cold air. Furthermore, the door is set into the confines of the vehicle so that it does not project from the sides thereof.

At the upper edge the door passes beneath the wood frame member 271 maintained in a U shaped metal sheathing 272 which is secured to the upper angle member 225 by bolts 273, which are also adapted to secure the interior sheet metal ceiling or roof 257 of the vehicle. A water shield 274 extends longitudinally of the vehicle just above the emergency door and is secured by the rivets which secure the body sheathing to the angle member 225. The upper edge of the door frame is also provided with a resilient seal 275, against which the emergency door 172 engages when closed.

The sill provided for the movable windows of the vehicle body is shown in detail in Figure 19 which is taken on line 19—19 of Figure 14. It will be seen that the longitudinally extending angle member 215 forms the base sill of the movable windows and the metal sheathing 246 is riveted thereto, and an additional sheet metal window frame 277 is also riveted by the same rivets. Member 277 extends inwardly of the body of the vehicle and is provided with an upwardly extending portion 278 having a reverse bend therein and extending downwardly and terminating in an outwardly extending flange 279. The movable windows of the vehicle are adapted to be closed directly against the sheet metal member 277 and rest against the upstanding flange 278 thereof. The downwardly extending portions of members 277 and the flanges 279 thereof provide an interior finish to the window sill.

The vehicle herein described embodies a basically new base frame and body construction. The necessity for a heavy chassis strong and rigid enough to carry all the load of the vehicle is eliminated and the base frame of the vehicle of the invention is materially lighter in weight and cheaper to build than prior heavy chassis constructions. This advantage is due to the strength imparted to the base frame by the body framing members and the metal body panels all rigidly united. All of the parts used to make up the body and base frame as herein disclosed cooperate to provide a staunch vehicle capable of withstanding severe strains and yet not having excessively heavy parts.

From an inspection of Figures 1 and 9, it will be apparent that a substantial space for the carrying of vehicle accessories, such as batteries, tools, and other equipment may be provided just beneath the two seat platforms on opposite sides of the vehicle. In one type of vehicle this space is approximately 9½ inches high, and on the left side of the vehicle extends back as far as the propeller shaft 72. This space may be also used for the storage of passenger's luggage such as suitcases and packages. For this purpose in order to get access to this storage space, the outer panels of the vehicle body may have doors hinged to swing outwardly from the vehicle.

It may be desirable to equip each bus with a radio receiving system for purposes of entertainment or, preferably, for placing the bus under control of a central or dispatching office. A preferred layout for such a system is shown in Figures 22 and 23, which are broken top plan and side elevations of the front end of a bus. As seen in Figure 22, a radio receiving antenna 301 is positioned on the roof of the vehicle and is supported upon suitable insulators 302, the lead-in wire 303 from the antenna preferably extending down the left side of the vehicle and beneath the platform upon which the driver is seated. This lead-in wire 303 is connected to a radio receiving set 304.

As seen in Figure 22, a preferable location for the receiving set 304 is adjacent the right hand side of the driver, and to this end the double seat previously described as positioned over the engine housing is replaced by a single rearwardly facing seat 305. Thus the receiver may be positioned horizontally on the engine housing, and the top thereof is adapted to have an upstanding flange with a flat space upon which may be positioned a map 306 of the zone in which the bus operates, and a note pad 307.

The loud speaker 308 may be positioned in any convenient location, being shown in Figure 22 as mounted on the left side of the vehicle adjacent the driver's seat, and being connected to the radio receiver by cables 309 which extend downwardly beneath the floor platform.

The battery 311 for the radio receiving set may be positioned in one of the cabinets between the level of the depressed aisle 61 and the level of the shelf upon which the raised seats are positioned. The battery 311 may be removed and replaced and serviced by way of an outwardly swinging door 312. A cable 313 extends beneath the floor board of the depressed aisle 61 and to the radio receiving set 304. Thus the battery, the wires and the loud speaker are positioned out of the way of the passengers and the driver.

The receiver 304 is conveniently positioned for tuning, and the top of the receiver is adjacent to the driver who may readily refer to the map 306, and may make notes on the pads 307 of the addresses at which he is to call and other information regarding the taking on or discharge of passengers. With the cruising busses equipped with radio receivers and speakers, a central broadcasting station or a commercial broadcasting station may readily direct any bus in any particular zone to stop at a specified point for receiving passengers.

A modified form of seating arrangement is shown in Figure 21 wherein the seating capacity of the bus is increased to 22 passengers with no increase in the overall dimensions of the vehicle. In this type of vehicle, the usual depressed aisle 61 is provided and the double front seat 58 faces to the rear of the vehicle. Furthermore the three single forwardly facing seats 168 are positioned on the right hand side of the vehicle and on the left hand side thereof, the seats 321 are made slightly wider to extend slightly beyond the center line of the vehicle, whereby each seat 321 may accommodate three passengers instead of two as in the arranagement shown in Figure 2. Furthermore, the rear seat 322 may be arranged to accommodate five passengers. In a vehicle having this seating arrangement, the radio receiver may be positioned at any convenient point which will not interfere with the seating arrangements.

Figures 24 and 25 illustrate an improved form of thermostatic control for the radiator shutter, embodying a casing 331 adapted to be mounted adjacent the radiator and having an expansible bellows to cause rod 332 to reciprocate when the heat-sensitive liquid or gas within the bellows expands. Rod 332 is connected to a bell crank 333 the other arm of which is connected to rod 334 which extends downwardly to open and close the shutter. The water from the radiator 51 is caused to circulate through casing 331 by pipes 335 and 336 connected to the inlet and outlet water connections 337 and 338. The casing 331 is a separate unit which may be mounted in any convenient location and need not be built into the radiator. The forced circulation of water in the radiator causes a circulation through casing 331 to affect the heat-sensitive liquid or gas.

By the above-described construction a separate detachable mechanism is provided to open and close the radiator shutters in accordance with water temperature. The movable shutters are mounted in a separate shell which may be positioned over the radiator shell and the operating mechanism may be conveniently mounted and connected as described.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A road vehicle comprising a body of boxlike form, a base frame constructed of relatively light framing members and including a peripheral frame member extending completely around the vehicle, a longitudinal frame member offset from the center line of said base frame, a plurality of transverse framing members secured at their ends to the peripheral member, axles disposed beneath said base frame between adjacent transverse members, springs secured to said axles and to adjacent transverse members, a motor spaced between the forwardly disposed transverse members and located substantially on the longitudinal center line of said vehicle, a drive shaft extending from said motor to the rear axle, said drive shaft being above the level of said peripheral frame member, and an aisle extending longitudinally of said vehicle at one side of said drive shaft and substantially in the plane of said peripheral frame member.

2. A passenger-carrying road vehicle characterized by its light weight and low center of gravity comprising a base frame constructed of relatively light members and including a peripheral frame member extending completely around the vehicle, a plurality of transverse members connected at their ends to said peripheral member; an internal combustion engine mounted on said base frame adjacent the front end thereof; a front dead axle and a rear driven axle connected to said frame by springs; a drive shaft extending from said engine to the rear axle, said drive shaft being above the plane of the peripheral member and passing above some of said transverse members; a longitudinal aisle substantially in the plane of the peripheral frame member and to one side of the drive shaft; a seat platform extending from one side of the vehicle to the aisle and covering said drive shaft; and relatively light metal body framing members and metal body rigidly united to said base frame and reinforcing said base frame.

3. The invention as defined in claim 2 wherein said seat platform extends completely across the back of the vehicle and forwardly on the other side of the vehicle to a doorway, to define a depressed aisle with raised seats on both sides thereof.

4. A passenger-carrying vehicle comprising a body of box-like form, an internal combustion engine disposed adjacent the forward end of said body and projecting partially within said body and housed thereby, a housing for said engine extending from one side of the body and terminating short of the other side, a driver's seat and vehicle control mechanism between said engine housing and one side of the body, and a rearwardly facing folding seat positioned over the engine housing.

5. The invention as defined in claim 4 wherein the folding seat is spaced from the front of the body to provide a shelf space on top of the engine housing.

6. A passenger carrying vehicle comprising a body of box-like form, an internal combustion engine disposed adjacent the forward end of said body and projecting partially within said body and housed thereby, a housing for said engine extending from one side of said body and terminating short of the other side, a driver's seat and vehicle control mechanism between said engine housing and one side of said body, and a rearwardly facing seat positioned over said engine housing at the other side of the body, an opening in said body on the side adjacent said rearwardly facing seat, and an aisle accessible from said opening communicating with seats disposed along said body adjacent the sides thereof.

7. A passenger-carrying vehicle comprising a body of box-like form, an internal combustion engine disposed adjacent the forward end of said body and projecting partially within said body and housed thereby, a housing for said engine extending from one side of the body and terminating short of the other side, a driver's seat and vehicle control mechanism between said engine housing and one side of the body, and a rearwardly facing seat positioned over said engine housing.

8. A passenger-carrying vehicle comprising a body of box-like form, an internal combustion engine disposed adjacent the forward end of said body and projected partially within said body and housed thereby, a housing for said engine extending from one side of the body and terminating short of the other side, a driver's seat and vehicle control mechanism between said engine housing and one side of said body, and a rearwardly facing seat positioned over the engine housing and spaced from the front of the body to provide a shelf space in front of the engine housing.

9. A road vehicle characterized by its low center of gravity and light weight comprising a base frame constructed of relatively light framing members and including a peripheral frame member extending completely around the vehicle, said peripheral frame member being arched at the intended positions of the wheels, a plurality of transverse framing members supported at their ends by said peripheral member, certain of said transverse members lying above the plane of said peripheral member and serving to support a floor, two relatively short longitudinal members secured to two rear transverse members substantially at the level of said floor, and two short engine supporting longitudinal members positioned above and secured to two front transverse members, wheel supported front and rear axles, and front and rear springs secured to said axles and to said two front and two rear transverse members respectively.

10. A road vehicle having a body comprising a base frame including a peripheral frame extending around the vehicle, said peripheral frame being curved to provide arched portions at each rear wheel, a pair of transverse frame members secured at their ends to said peripheral frame adjacent said arched portions, two longitudinal members secured to said transverse members, additional longitudinal members secured at one end thereof to said first named longitudinal members at a point between their ends, brackets secured to one transverse member of said pair, said additional longitudinal members being secured at their remaining ends to said brackets, and vehicle springs secured to said brackets by spring connecting means at points adjacent the connections of the longitudinal members and said transverse member, the connection of said additional members to said brackets serving to relieve said transverse member of said pair having said brackets secured thereto of torsional stresses imposed by said spring connections.

WILLIAM B. FAGEOL.
FRANK R. FAGEOL.